No. 813,588. PATENTED FEB. 27, 1906.
J. E. ROLLINS.
ADJUSTABLE PIPE BRACKET.
APPLICATION FILED FEB. 28, 1905.

Witnesses;

Inventor;
John E. Rollins,
per Paul Synnestvedt, Jr.
Atty.

No. 813,588. PATENTED FEB. 27, 1906.
J. E. ROLLINS.
ADJUSTABLE PIPE BRACKET.
APPLICATION FILED FEB. 28, 1905.

Witnesses:
Cyril C Cricks
F. E. Gaither

Inventor:
John E. Rollins,
per Paul Synnestvedt
Att'y.

UNITED STATES PATENT OFFICE.

JOHN E. ROLLINS, OF CHICAGO, ILLINOIS, ASSIGNOR TO CRANE COMPANY, OF CHICAGO, ILLINOIS, A CORPORATION OF ILLINOIS.

ADJUSTABLE PIPE-BRACKET.

No. 813,588.　　　　Specification of Letters Patent.　　　　Patented Feb. 27, 1906.

Application filed February 28, 1905. Serial No. 247,661.

*To all whom it may concern:*

Be it known that I, JOHN E. ROLLINS, a citizen of the United States, residing at Chicago, in the State of Illinois, have invented certain new and useful Improvements in Adjustable Pipe-Brackets, of which the following is a specification.

My invention relates to means for supporting lines of pipe, and to brackets providing for the adjustment of the alinement of the pipe both vertically and laterally. Other objects of the invention are, to provide for carrying the weight of the pipe on the median line of the bracket and to attach the fastening means in the median line of the bracket; to allow for easy application and manipulation of the attaching screws without interference with the web of the bracket, to allow for easy change of attaching means to fit different diameters of pipe, and to generally improve the structure and operation of pipe supporting brackets. These objects and other advantages which will hereinafter appear, I attain by means of the construction illustrated in preferred forms in the accompanying drawings, wherein—

Figure 1:
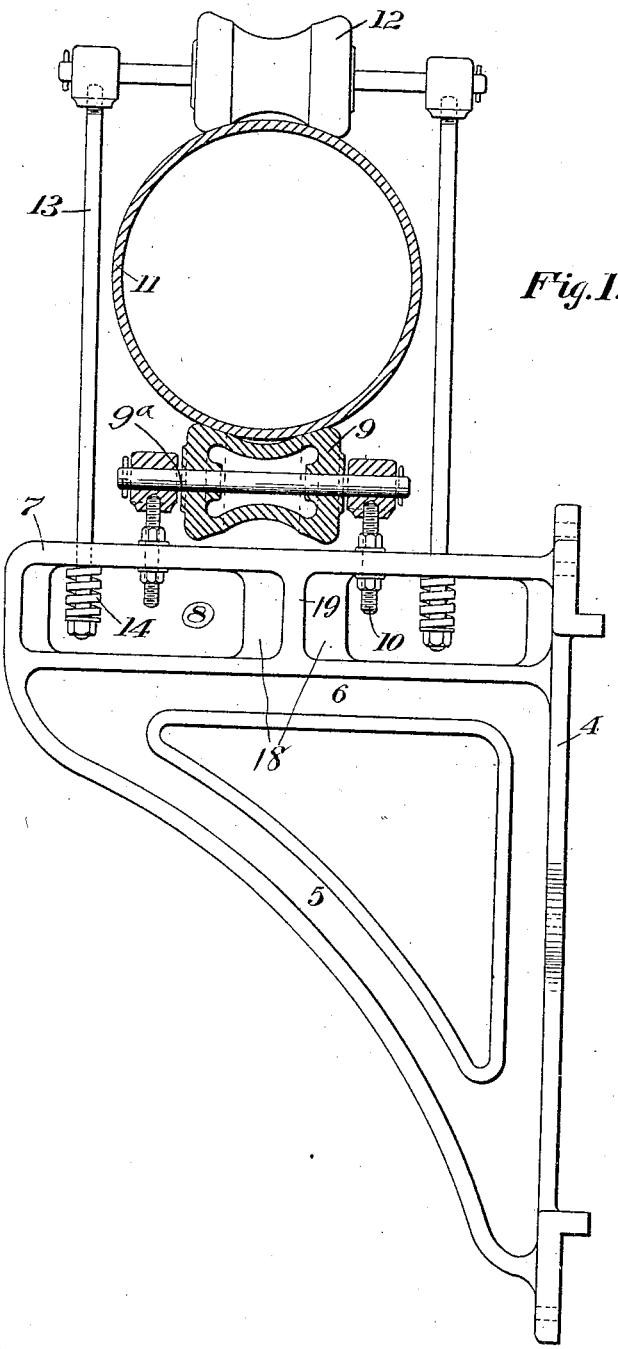
Figure 1 is a side elevation of the bracket and retaining devices showing in section a pipe supported thereon.
Figure 2:
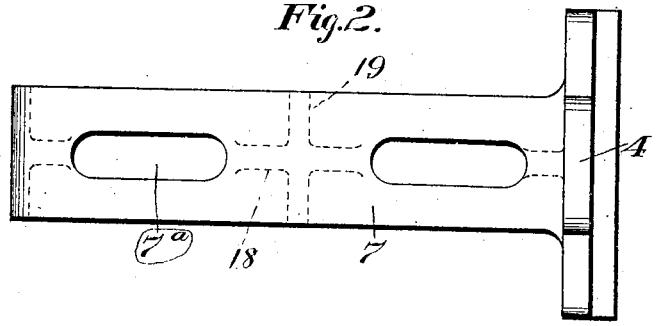
Figure 2 is a top plan view of the bracket shown in Figure 1.

The bracket as shown in the drawings may be of any desired design as to its general structure, having a flat face base 4 to engage with a supporting beam or post, the same being attached as is usual by bolts or screws through the flat face or flange of the plate 4, and the bracket having the usual stiffening strut 5 and the horizontal member 6. Above this member 6, supported by webs and crosswebs as shown in Figure 1, is a top plate 7 which is used to support the cross-bar 9ᵃ having a roller 9 thereon and which is attached by means of the adjusting screws 10 provided with two nuts so as to vary their length as desired, and these are fixed by engagement in the elongated slot 7ᵃ, (Figure 2). The pipe 11 rests upon the support 9 and the weight is thus taken directly over the web or median line of the bracket. It may be held down by means of a cross-bar carrying roller 12 and supported by upright screws 13 which also engage the slot 7ᵃ and may be conveniently held down under tension by means of coil springs 14 as shown.

Figure 3:
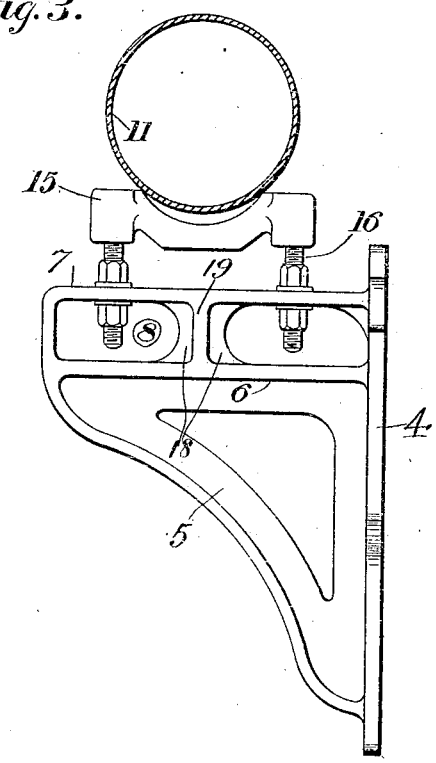
Figure 3 is a side elevation of a modified form of the bracket and support with a section of the pipe thereon.

In Figure 3 I have shown a modified form which in its essentials is the same, the screws 16 supporting a notched cross-bar 15 for the maintenance of the pipe. In both devices it will be observed that the fixing nuts of the attaching screws 10 and 16 are easily accessible in the open spaces 8 provided in the web by having a separate supplementary supporting plate 7 fixed upon the horizontal portion 6 by means of the supporting webs. It will be seen that the center line of the pipe may be easily adjusted either vertically or laterally upon the bracket for alinement of the pipe, there is no twisting strain on the bracket, and that the pipe may be removed or put in place very readily, since the open space 8 gives easy access to the nuts on the bolts 10 and 13. Other advantages will readily occur to those familiar with the use of such devices.

Having thus described my invention and illustrated its use, what I claim as new, and desire to secure by Letters Patent, is the following:

1. In a pipe bracket the combination of a fixed horizontal bracket, and pipe holding and clamping devices mounted on said bracket, said devices including vertical adjusting screws for varying the elevation, engaging the fixed bracket adjustably in a horizontal direction, substantially as described.

2. In a pipe bracket the combination of a supporting webbed bracket having a slotted top plate, clamping devices mounted for adjustment vertically and horizontally thereon, and comprising vertical adjusting screws passing through the slot of the top plate, and the said slot being in the median line of the plate, substantially as described, whereby the pipe is supported directly over the web of the bracket.

3. In a pipe bracket, the combination with an attaching base plate 4 and a horizontal top plate 7 having open slots 7ᵃ in the median line thereof, of a web 5 and a horizontal flange attached thereto beneath the top plate and spaced apart therefrom to leave open spaces between the flange and plate, whereby attaching devices for the pipe may be passed through the slot in the top plate and their ends manipulated in the space under the top plate.

4. In a pipe bracket, the combination with adjustable pipe holders 9 and 12, bolts 10 and 13 and nuts for supporting said holders, of a bracket having a top plate with slots 7ª at the median line thereof, and a web with open spaces in communication with said slots, beneath said top plate, said bolts extending through said slots and said open spaces receiving said nuts and the lower ends of said bolts.

5. The combination with a bracket having a vertical web and a centrally slotted top flange plate, and open spaces 8 in the web under said top plate, of a pipe support carried by said bracket comprising bolts 10 engaging the slots in said plate and nuts for adjusting their position therein, whereby the weight of the pipe may be supported over the median line of the bracket and the pipe support may be adjusted both vertically and laterally on the bracket.

6. A pipe bracket comprising the combination of a vertical face plate, a supporting arm and a horizontal plate above and spaced from said supporting arm, said horizontal plate being provided in its median line with slots communicating with the space beneath, bolts extending through said slots and adjustable therein vertically and laterally and adapted to carry a pipe supported at their upper ends, substantially as described.

In testimony whereof I have hereunto signed my name in the presence of the two subscribed witnesses.

JOHN E. ROLLINS.

Witnesses:
PAUL CARPENTER,
ALBERT GRANT MILLER.